(12) United States Patent
Schoonover et al.

(10) Patent No.: US 9,797,811 B2
(45) Date of Patent: Oct. 24, 2017

(54) SYSTEM AND METHOD FOR IDENTIFYING DATA USEFUL FOR VALVE DIAGNOSTICS

(71) Applicant: Dresser, Inc., Addison, TX (US)

(72) Inventors: Larry Gene Schoonover, Falmouth, MA (US); Robert Claude Prescott, Marshfield, MA (US)

(73) Assignee: Dresser, Inc., Addison, TX (US)

( * ) Notice: Subject to any disclaimer, the term of this patent is extended or adjusted under 35 U.S.C. 154(b) by 575 days.

(21) Appl. No.: 14/140,012

(22) Filed: Dec. 24, 2013

(65) Prior Publication Data
US 2015/0176721 A1 Jun. 25, 2015

(51) Int. Cl.
| | |
|---|---|
| G01B 5/28 | (2006.01) |
| G01M 99/00 | (2011.01) |
| G05B 23/02 | (2006.01) |
| F16K 37/00 | (2006.01) |

(52) U.S. Cl.
CPC ......... *G01M 99/00* (2013.01); *F16K 37/0041* (2013.01); *G05B 23/0221* (2013.01)

(58) Field of Classification Search
CPC . G01M 99/00; F16K 37/0041; G05B 23/0221
See application file for complete search history.

(56) References Cited

U.S. PATENT DOCUMENTS

| | | | |
|---|---|---|---|
| 5,094,532 A | 3/1992 | Trainer et al. | |
| 5,428,357 A | 6/1995 | Haab et al. | |
| 6,678,584 B2 | 1/2004 | Junk et al. | |
| 7,089,086 B2 | 8/2006 | Schoonover | |
| 7,516,043 B2 | 4/2009 | Junk et al. | |
| 2007/0251477 A1 | 11/2007 | Nozawa et al. | |
| 2008/0065706 A1 | 3/2008 | Miller et al. | |
| 2009/0070069 A1 | 3/2009 | Bouse et al. | |

(Continued)

FOREIGN PATENT DOCUMENTS

| | | |
|---|---|---|
| CN | 103328936 A | 9/2013 |
| WO | 2013054707 A1 | 4/2013 |
| WO | WO2012100181 A1 * | 7/2016 |

OTHER PUBLICATIONS

International Search Report and Written Opinion issued in connection with corresponding PCT Application No. PCT/US2014/068627 dated Feb. 25, 2015.

*Primary Examiner* — Matthew G Marini
(74) *Attorney, Agent, or Firm* — Paul Frank + Collins P.C.

(57) ABSTRACT

Embodiments of systems and methods that can facilitate data collection for valve diagnostics. The systems can include a valve assembly with a valve and a sampling device that is configured to access a repository with a first buffer and a second buffer. During operation, the valve assembly is configured to read data representing operating variables for the valve into the first buffer. The valve assembly is also configure to determine a quality measure for a first sample set of data from the first buffer, the quality measure indicating the usefulness of the first sample set of data for predicting performance of the valve relative to a second sample set of data from the second buffer. In one embodiment, the valve assembly is further configured to read data from the first buffer into the second buffer in response to the quality measure indicating that the first sample set of data is relatively more useful than the second sample set of data.

6 Claims, 6 Drawing Sheets

(56) References Cited

U.S. PATENT DOCUMENTS

| | | |
|---|---|---|
| 2010/0152907 A1 | 6/2010 | Meier et al. |
| 2012/0186655 A1 | 7/2012 | Smirnov et al. |
| 2013/0238137 A1 | 9/2013 | Kashima et al. |
| 2013/0239708 A1 | 9/2013 | Tanaka et al. |
| 2014/0257625 A1 | 9/2014 | Kusuno et al. |

* cited by examiner

SYSTEM AND METHOD FOR IDENTIFYING DATA USEFUL FOR VALVE DIAGNOSTICS

BACKGROUND

The subject matter disclosed herein relates to valves and valve diagnostics with particular discussion below that describes techniques to improve efficiency of data collection for diagnostic analysis of a valve assembly on a process line.

Industrial factories and like facilities operate process lines that may include many varieties of flow controls. Examples of these flow controls include pneumatic and electronic valve assemblies (also "control valves") that regulate a flow of process fluid (e.g., gas and liquid). In conventional configurations, these valve assemblies have a number of components that work together to regulate flow of process fluid through the valve assembly. These components include a stem, a plug, a seat, and an actuator that couples with the stem to change the position of the plug relative to the seat. The components can also include various linkages and springs that ensure proper movement, e.g., of the stem and/or the plug. In some constructions, the valve assembly incorporates a valve positioner with electrical and/or electro-pneumatic components. During operation, the valve positioner instructs the actuator to change the position of the plug relative to the seat. Often, the valve positioner issues the instructions in response to control signals from a controller that is part of a process control system (also "distributed control system" or "DCS"). The instructions are part of management functions in the DCS that can, inter alia, cause the valve assemblies to operate in a manner that achieves the process parameters set out for the process line.

Facilities and operators often allow techniques that collect data from the valve assemblies to diagnose issues that could be detrimental to operation of the process lines. These techniques typically do not interrupt operation of the valve assemblies. The data may include data that relates to operative variables including setpoint, pressure, position, and like information. This data is available via the DCS, the valve positioner, and/or other components in the facility. However, although the data that reflects the operating variables is helpful to diagnose problems with the valves, processes are meant to minimize variations in operating variables to maintain stability and predictability of the process output. The stability of the process requires techniques to continuously collect data from the valve assemblies to increase the likelihood that the data collected will reveal observable movement in the components of valve assembly. This movement is critical for proper diagnosis of the device using many online diagnostics and related predictive maintenance techniques. Unfortunately, the vast number of valve assemblies in use in the facility, as well as limits on bandwidth on the systems/networks to gather data, can frustrate the process of data collection. These limitations can prevent diagnostic techniques to capture enough data to identify movement or other activities of the valve assemblies, let alone to observe problems with one or more valves assemblies on the process line.

BRIEF DESCRIPTION OF THE INVENTION

This disclosure describes improvements that can identify data best suited for use in diagnostic programs and for related processing to determine operations of the valve assemblies on the process line. These improvements can implement data processing on-board the valve assembly, thus reducing reliance of the valve diagnostic system on the control system network for data acquisition and sampling. In this way, the diagnostic system receives data that is most likely to result in analysis at the diagnostics programs that can effectively predict the onset of problems and/or issues on the valve assembly. Moreover, on-board data capture, analysis, and processing is also advantageous to analyze variables that can change rapidly. This feature can help understand dynamic behavior of the valve assembly.

Examples of these diagnostics programs can use the data to determine one or more performance indicators that are useful to gauge and, importantly, predict future performance of the valve 102. Examples of these performance indicators include friction, spring range, lag, stick slip, and like parameters that can, in one example, be mathematically calculated from the data representing the operating variables discussed herein. For several examples of such mathematical calculations, reference can be had to U.S. Pat. No. 7,089,086 to Schoonover and commonly assigned to the Assignee designated in the present application. The content of this patent is incorporated by reference in its entirety herein.

As set forth more below, this disclosure presents embodiments of systems and methods that can facilitate data collection for valve diagnostics. The systems can include a valve assembly with a valve and a sampling device that is configured to access a repository with a first buffer and a second buffer. During operation, the sampling device is configured to read data representing operating variables for the valve into the first buffer. The valve assembly is further configure to determine a quality measure for a first sample set of data from the first buffer, the quality measure indicating the usefulness of the first sample set of data for predicting performance of the valve relative to a second sample set of data from the second buffer. In one embodiment, the valve assembly is further configured to read data from the first buffer into the second buffer in response to the quality measure indicating that the first sample set of data is relatively more useful than the second sample set of data.

BRIEF DESCRIPTION OF THE DRAWINGS

Reference is now made briefly to the accompanying drawings, in which.

Where applicable like reference characters designate identical or corresponding components and units throughout the several views, which are not to scale unless otherwise indicated.

DETAILED DESCRIPTION

Figure 1:
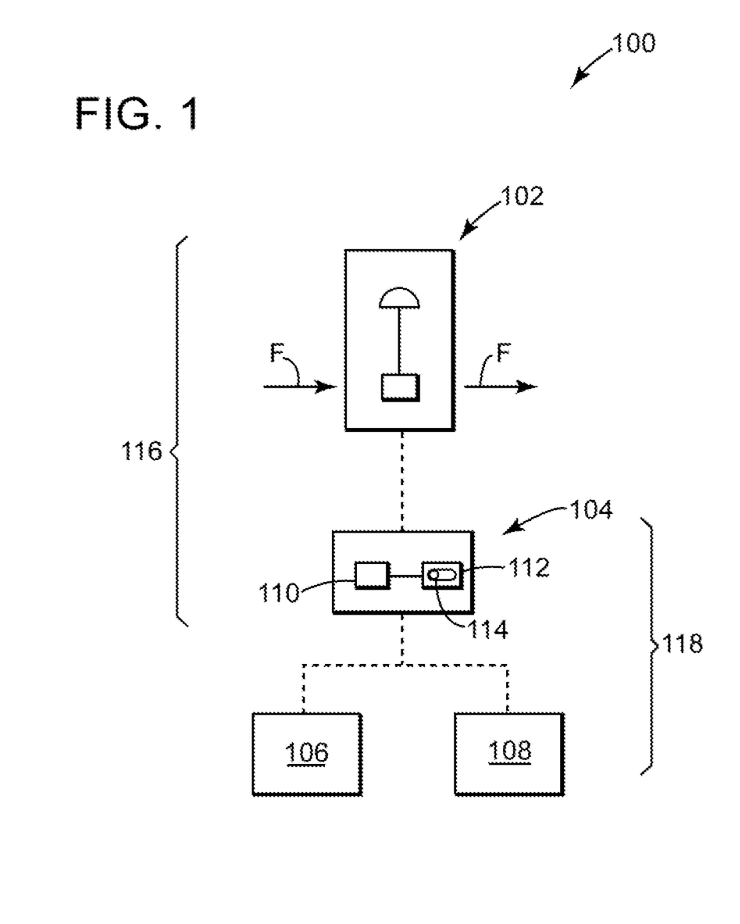
FIG. 1 depicts a schematic diagram of an exemplary embodiment of a system that is configured to can facilitate data collection for use in valve diagnostics.

FIG. 1 depicts a schematic diagram of an exemplary embodiment of a system 100 that can facilitate data collection for valve diagnostics. The system 100 includes a valve 102 with components (e.g., an actuator, a valve stem, a plug, a seat, etc.) that are configured to regulate the flow of a process fluid F. The system 100 also includes a sampling device 104 that couples with the valve 102 and has access to one or more buffers (e.g., a first 106 and a second buffer 108). The sampling device 104 may include a processor 110 and memory 112 with executable instructions 114 stored thereon. Examples of the executable instruction 114 may include all or part of a software program, firmware, and/or related listing of operative instructions that can cause the sampling device 104 to perform one or more actions as described herein. In one embodiment, the valve 102, and/or the sampling device 104, and/or the buffers 106, 108 may be part of a valve assembly 116 with a valve positioner 118 that is configured to control operation of the valve 102. The valve positioner 118 may couple with and/or, in the construction show in FIG. 1, incorporates all or part of the sampling device 104 and the buffers 106, 108. This disclosure also contemplates configurations of the repositories and/or buffers 106, 108 in which one or more of the repositories are located remote from the valve assembly 116.

The system 100 can gather and interrogate data to identify data having particular utility to analysis of the operation of the valve 102 and other related valve diagnostics. The sampling device 104 may, for example, acquire data that describes operation of one or more of the components of the valve 102. This data may represent one or more operating variables (e.g., setpoint, position, actuator pressure, etc.) for the valve 102. In one implementation, the system 100 can process the data to identify data that is best suited for use in diagnostic processes. These processes may occur on or at the sampling device 104, which can embody an "on-board" operative configuration to collect, store, and process diagnostic data locally at the valve assembly 116.

As set forth more below, the system 100 can deliver the identified, or more useful, data to any suitably configured diagnostic program. However, unlike conventional diagnostic systems that provide only periodic samples of data from the valve 102 for analysis, the proposed configuration of the system 100 can continuously (and periodically in manner that approximates continuous sampling, as desired) sample data from the valve 102. This configuration can deliver only the most pertinent data for use in the diagnostic processes. This feature of the system 100 provides data to the diagnostic programs that is more likely to result in favorable analysis of the performance indicators to effectively diagnosis and/or predict operation of the valve 102. Moreover, moving the functions for collecting and interrogating the data to the system 100 avoids the bandwidth problems that plague conventional data sampling and diagnostic techniques.

Figure 2:
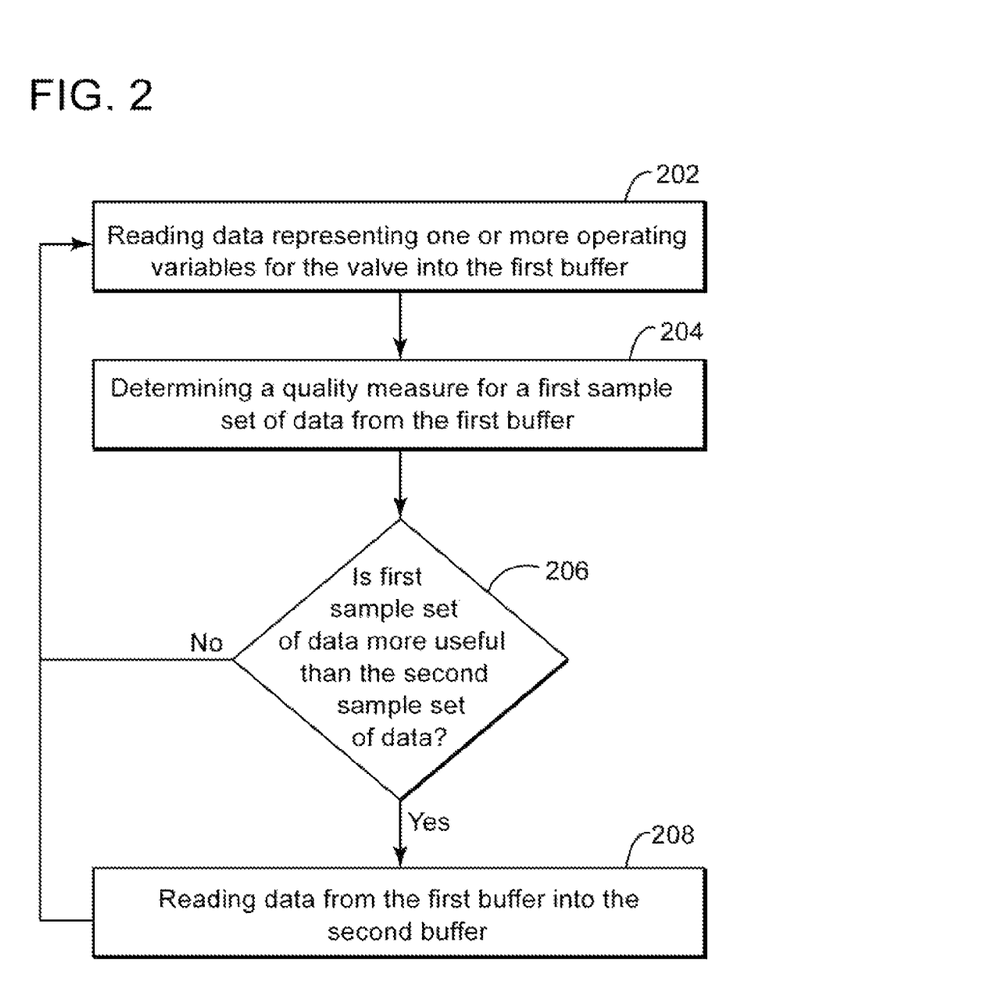
FIG. 2 depicts a flow diagram of an exemplary embodiment of a method to identify the data that is useful for valve diagnostics.

FIG. 2 depicts a flow diagram of an exemplary embodiment of a method 200 to identify the data that is useful for valve diagnostics. The method 200 includes, at step 202, reading data representing one or more operating variables for the valve into the first buffer. The method 200 also includes, at step 204, determining a quality measure for a first sample set of data from the first buffer and, at step 206, using the quality measure to identify whether the first sample set of data is more useful than the second sample set of data. If the first sample set of data is more useful that the second sample set of data, then the method 200 includes, at step 208, reading data from the first buffer into the second buffer. On the other hand, if the first sample set of data is not more useful than the second sample set of data, then the method 200 can continue, at step 200, to read (or acquire) more data for further processing and evaluation in accordance with the embodiments set forth herein.

The step of reading data into the first buffer (e.g., at step 202) can instruct the sampling device 104 to direct data representing the operating variables for the valve 102 to certain repositories (e.g., memory). This data may originate from sensors and other devices (e.g., the actuator, a regulator, a pressure/current converter, etc.), one or more of which provides information about the operation of the valve 102. As shown in FIG. 1, these repositories may include one of the buffers 106, 108. Examples of the repositories can utilize a circular data structure that has a fixed size and/or capacity. This structure allows the sampling device 104 to continuously acquire data from the valve 102, in effect generating a constant stream of data that is stored, e.g., in the first buffer 106. During operation, when the capacity of the first buffer 106 is reached, the system 100 is configured to read data that the sampling device 104 acquires over previously stored data in the first buffer 106.

The system 100 can read (also "store") and/or arrange the data in the repository (e.g., the first buffer 106 and the second buffer 108) as a table, database, and/or like configuration. In one example, the data includes one or more datasets that group one or more measured data taken (and/or collected and/or acquired) by the sampling device 104 at relatively the same time. Examples of the sample set (e.g., the first sample set) identify a time-sequenced collection of datasets. This collection can include a plurality of datasets acquired over time Table 1 below provides an exemplary arrangement of data that makes up a sample set. During operation, the sampling device 104 can read this data into the first buffer 106. In other configurations, the sample set may comprise only part of the data that the sampling device 104 reads into the first buffer 106. The table lists the data in datasets, which is one way in which the data is collected and organized for use in evaluating the performance of a valve 102. In the example of Table 1 below, the sample set includes ten datasets, each dataset comprising a value for one or more operating variables, namely, setpoint (S), position (P), and actuator pressure (AP). Notably, this disclosure contemplates that there are a wide range of other operating variables that may be included in each dataset in accordance with the concepts disclosed herein.

TABLE 1

| Dataset | S | P | AP |
|---|---|---|---|
| 1 | S1 | P1 | AP1 |
| 2 | S2 | P2 | AP2 |
| 3 | S3 | P3 | AP3 |
| 4 | S4 | P4 | AP4 |
| 5 | S5 | P5 | AP5 |
| 6 | S6 | P6 | AP6 |
| 7 | S7 | P7 | AP7 |
| 8 | S7 | P8 | AP8 |
| 9 | S9 | P9 | AP9 |
| 10 | S10 | P10 | AP10 |

The amount of data in the first sample set can be defined by a sampling time interval and/or other chronological factor. For the system 100 of FIG. 1, the sampling time interval can provide a relative measure of the time between the first dataset (e.g., dataset 1 of Table 1) and the last dataset (e.g., dataset 10 of Table 1) as the sampling device 104 reads data representing the operating variables from the first valve 102 into the first buffer 106.

The step of determining the quality measure (e.g., at step 204) is useful to differentiate the first sample set from a second sample set. In an embodiment of the system 100 of FIG. 1, the second sample set includes data that the system 100 identifies as best suited for use in diagnostic processes. This embodiment can store the second sample set in the second buffer 108, which effectively distinguishes the data in the second sample set from other data that the sampling device 104 acquires and stores in the first buffer 106. In one example, the second sample set includes data the sampling device 104 acquires prior to (and/or chronologically before) the first sample set. Thus, in chronological terms, the first sample set contains current data (e.g., in the first buffer 106) and the second sample set contains past data (e.g., in the second buffer 108).

The quality measure can indicate the usefulness of the first sample set of data relative to the second sample set of data. The system 100 of FIG. 1 can use the quality measure (e.g., at step 206) to identify whether current data the sampling device 104 acquires from the valve 102 is better suited that the prior data in the second buffer 108 to calculate certain performance indicators that predict performance of the valve 102. As noted above, unlike conventional data processing, the system 100 acts as an intermediary to screen data before the data is communicated to a host device and/or other diagnostic processing device for use in diagnostic programs. This feature alleviates some of the bandwidth issues that prevail on may data networks in process facilities, thus presenting only data that is most likely, if at all, to identify issues and/or problems during further processing and analysis.

The step of reading data from the first buffer to the second buffer (e.g., at step 208) can modify the contents of the repositories to reflect the quality measure associated with the first sample set of data. In the system 100 of FIG. 1, for example, if the quality measure indicates that the first sample set is more useful that the second sample set, the system 100 may read all or part of the data in the first sample set from the first buffer 106 into the second buffer 108. This action may replace, or overwrite, the second sample set of data in the second buffer 108 with the data of the first sample set. In this way, the system 100 maintains the second buffer 108 with data that is most useful to calculate the performance indicators that predict performance of the valve. As discussed more below, the determination of usefulness of data may utilize the first value and the second value, wherein in one implementation, the quality measure indicates that the first value is different from the second value.

Other embodiments may include a plurality of buffers (e.g., a third buffer, a fourth buffer . . . n buffers, wherein n identifies the number of buffers available to receive data). Each of the plurality of buffers may contain a sample set of data (e.g., a third sample set, a fourth sample set, . . . n sample set, wherein n identifies the number of samples sets of data). In these embodiments, the system 100 can read data from the first buffer 106 into one of the plurality of buffers including the third buffer, when, for example, the quality measure of the indicates the first sample set is more useful than the second sample set, third sample set, the forth sample set, etc. This configuration can allow the system to maintain a plurality of sample sets (e.g., n sample sets) of varying degrees of usefulness by the diagnostic programs.

Figure 3:
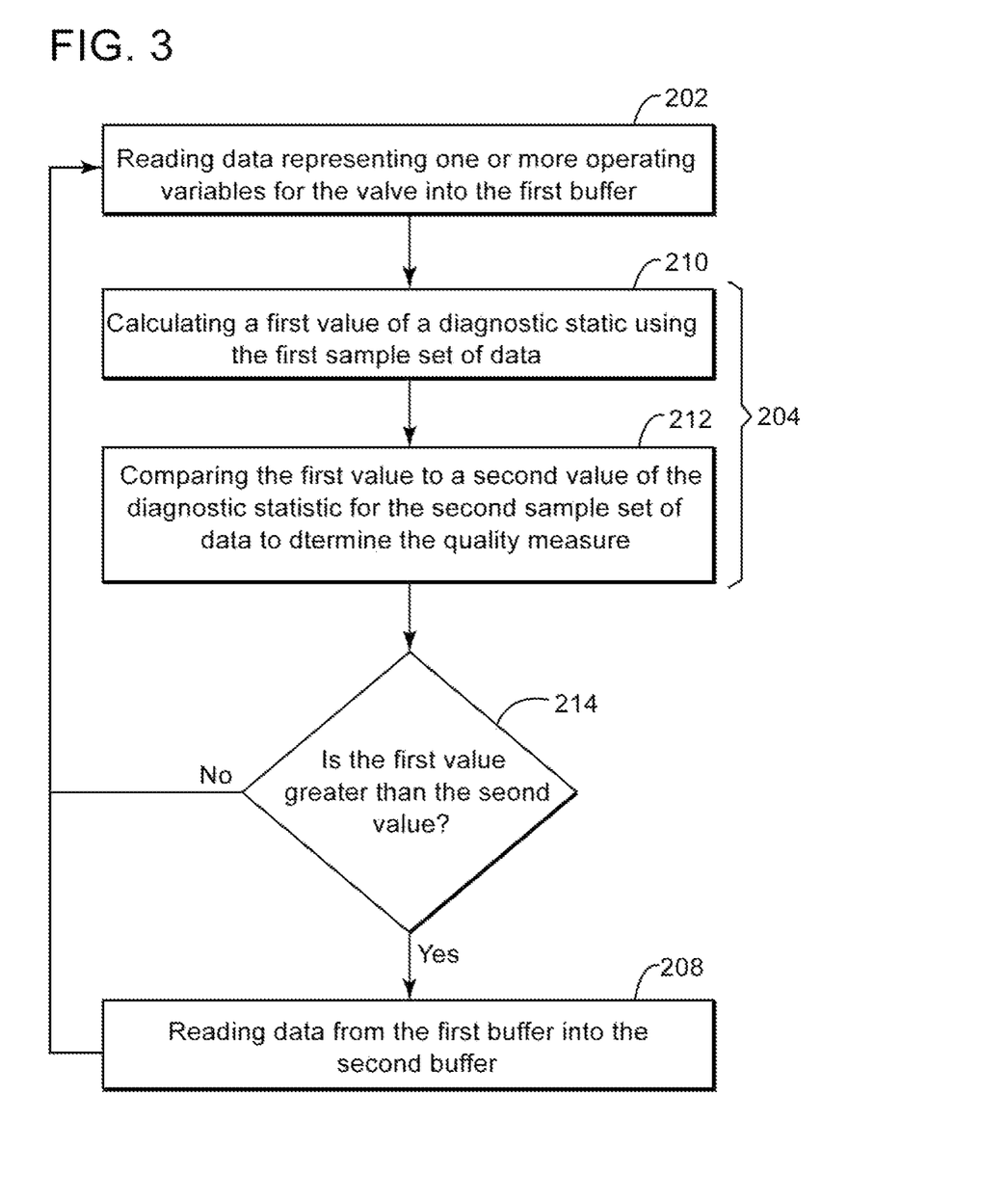
FIG. 3 depicts a flow diagram of the an example of the method of FIG. 2 with details of steps to evaluate the usefulness of data for valve diagnostics.

FIG. 3 depicts a flow diagram of an example of the method 200 that provides additional details as to the determination of the quality measure to identify the data that is useful for valve diagnostics. In FIG. 3, the exemplary method 200 includes, at step 210, calculating a first value of a diagnostic statistic using the first sample set. The method 200 also includes, at step 212, comparing the first value to a second value of the diagnostic statistic for the second sample set of data to determine the quality measure and, at step 214, using the relative measure (and/or position) of the first value relative to the second value to identify whether the first sample set of data is more useful than the second sample set of data.

The step of calculating the first value (e.g., at step 210) can use the data in the first sample set to determine one or more metrics that describe the performance of the valve 102. These performance metrics quantify certain aspects of the data. These aspects can include variance, deviation, trends, and other quantitative and/or statistical relationships that might exist between the data found the first sample set. In the system 100 of FIG. 1, the system 100 may select and use performance metrics that identify variance in setpoint S and/or or valve position P across all of the datasets in the first sample set. The system 100 may also quantify (or aggregate) the number of times the valve position P indicates a change of direction in the first sample set or, in one example, when a change of direction occurs after movement greater than a set amount in the first sample set. In other examples, the system 100 may quantify a maximum deviation in one of the operating values across the first sample set, e.g., as the maximum valve position P minus the minimum valve position P in the first sample set and/or as the maximum setpoint S minus the minimum setpoint S in the first sample set.

Embodiments of the method 200 may further combine and/or aggregate the performance metrics together to arrive at a single value for the diagnostic statistic. This functionality can provide, for example, a weighted average of the performance metrics. In one example, this weighted average may be calculated according to Equation (1) below:

$$D_S = W_1 P_1 + W_2 P_2 + \ldots W_i P_i, \qquad \text{Equation (1)}$$

wherein $D_S$ is the diagnostic statistic, $P_i$ is the performance metric, and $W_i$ is a weighting factor that is assigned and/or prescribed to each of the performance metrics. This weighting factor provides a measure of the importance of the performance metrics relative to one another. Using the discussion above as an example, the variance of the setpoint S may have be weighted relatively more importantly than the deviation of the valve position P.

The step of comparing the first value to a second value for the diagnostic statistic (e.g., at step 212) can identify the usefulness of the first sample set of data. In one example, the system 100 can determine the relationship (e.g., at step 214) between the first value and the second value, i.e., whether the first value is different from the second value, the first value is not equal to the second value, the first value is greater than the second value, the first value is less than the second value, the first value is equal to the second value. The system 100 can associate this relationship between the first value and the second value to the quality measure, thereby identifying the relative usefulness of the first sample set of data relative to the second sample set of data for performing diagnostic statistics. As noted above, the relationships may indicate that the first sample set is more useful for valve diagnostics than the second set, and vice versa.

Embodiments of the method 200 may also include one or more steps for retrieving the second value from the repository (e.g., the second buffer 108) and/or for calculating the second value from the second sample set of data as set forth herein. The method 200 may likewise include one or more steps for storing and/or retrieving the second value (and the first value) from the repository.

Figure 4:
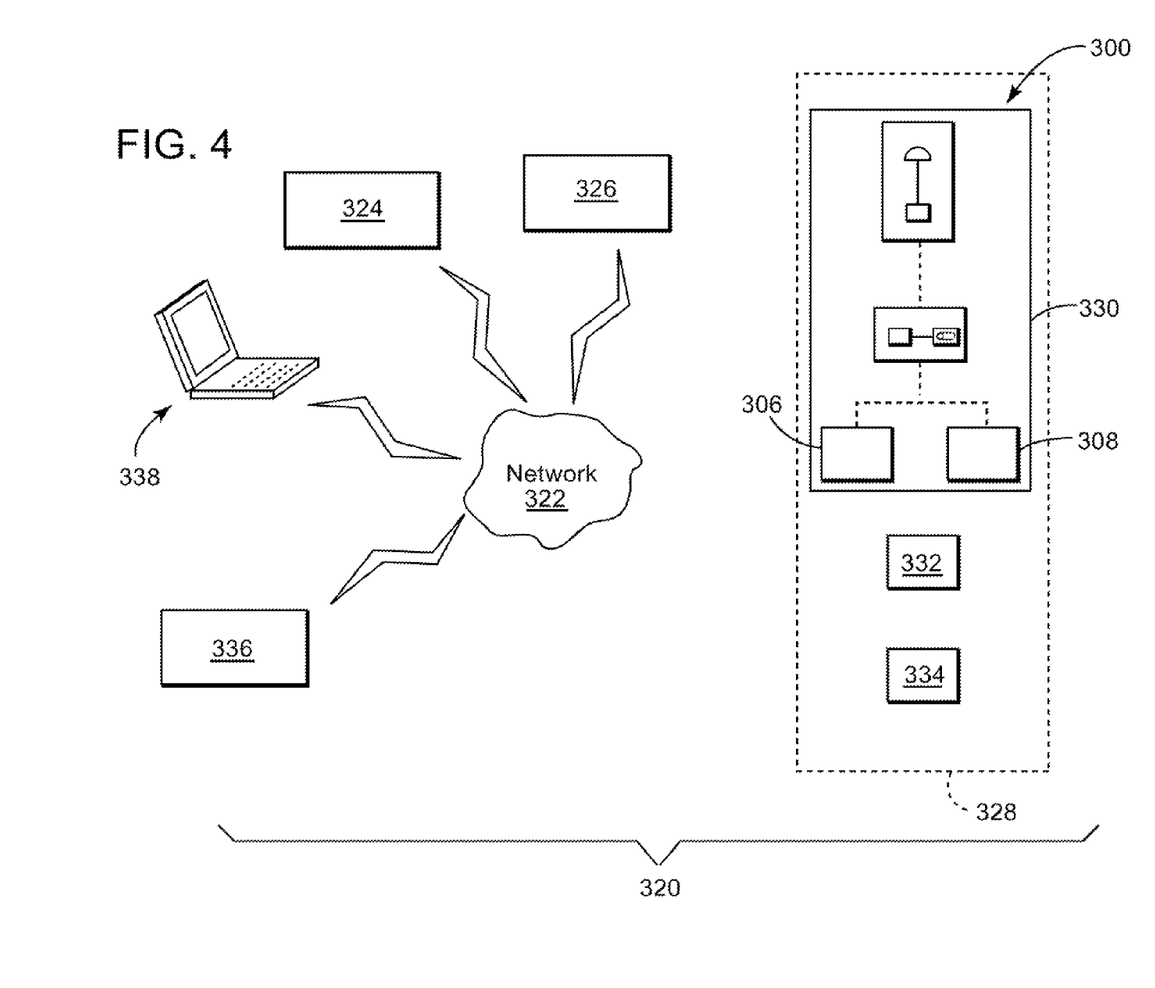
FIG. 4 depicts a schematic diagram of an exemplary embodiment of a system that is configured to can facilitate data collection for use in valve diagnostics as part of a process system having a process line.

FIG. 4 illustrates an exemplary embodiment of a system 300 as part of a process system 320 found, commonly, at industrial plants, facilities, and factories. The process system 320 includes a network 322 that may deploy various wired and wireless constructions to facilitate the exchange of data and information In many facilities, for example, the constructions utilize HART®, FOUNDATION® Fieldbus, and like communication protocols among components of the process system 320. These components may include a process controller 324, a management server 326, and a process line 328 with one or more process devices (e.g., a first device 330, a second device 332, and a third device 334). As contemplated herein, one or more of the process device 330, 332, 334 can embody the structure of the valve assembly 300 to modulate flow of process fluids in the process line 328. The process system 320 may also include one or more external servers (e.g., a first external server 336) that are useful for data collection and storage and other peripheral functions. The process system 320 may further include one or more terminals (e.g., a first terminal 338). Examples of the terminal 338 can include a variety of computing devices (e.g., personal computers, workstations, laptop computers, tablet computers, smartphones, etc.) that an end user can utilize to interface with the process controller 324, the servers 326, 336, and/or the process devices 330, 332, 334.

The process controller 324 can be part of a distributed control system ("DCS") that issues commands over the network 322 to the process devices 330, 332, 332. For control valve assemblies, these commands can instruct the valve positioner to operate the actuator to modulate flow through the valve assembly. The management server 326 (and/or the sever 336 and terminal 338) can communicate with process devices 330, 332, 334 through the DCS or, in one example, directly via the network 322. This configuration allows the management server 326 to collect and process data to provide, among other things, overall guidance as to the operation of the process line 328 (and, in certain configurations, the operation of components of the system 320 and the process facility in general).

Components of the process system 320 may generate signals to the system 300 to solicit data for use in diagnostic processes. These signals may, for example, instruct the system 300 to communicate data most useful to determine the performance metrics discussed herein. In one implementation, the system 300 can generate an output that comprises all or part of the data that is stored in the second buffer 308, which as noted herein may include data identified by the system 300 as being most useful for valve diagnostics. The output may, in other examples, include other data, e.g., values for the quality measure, the first value of the diagnostic statistic, and/or the second value of the diagnostic statistic, which the components of the process system 320 may request from time-to-time, e.g., via the signals generated to the system 300.

Figure 5:
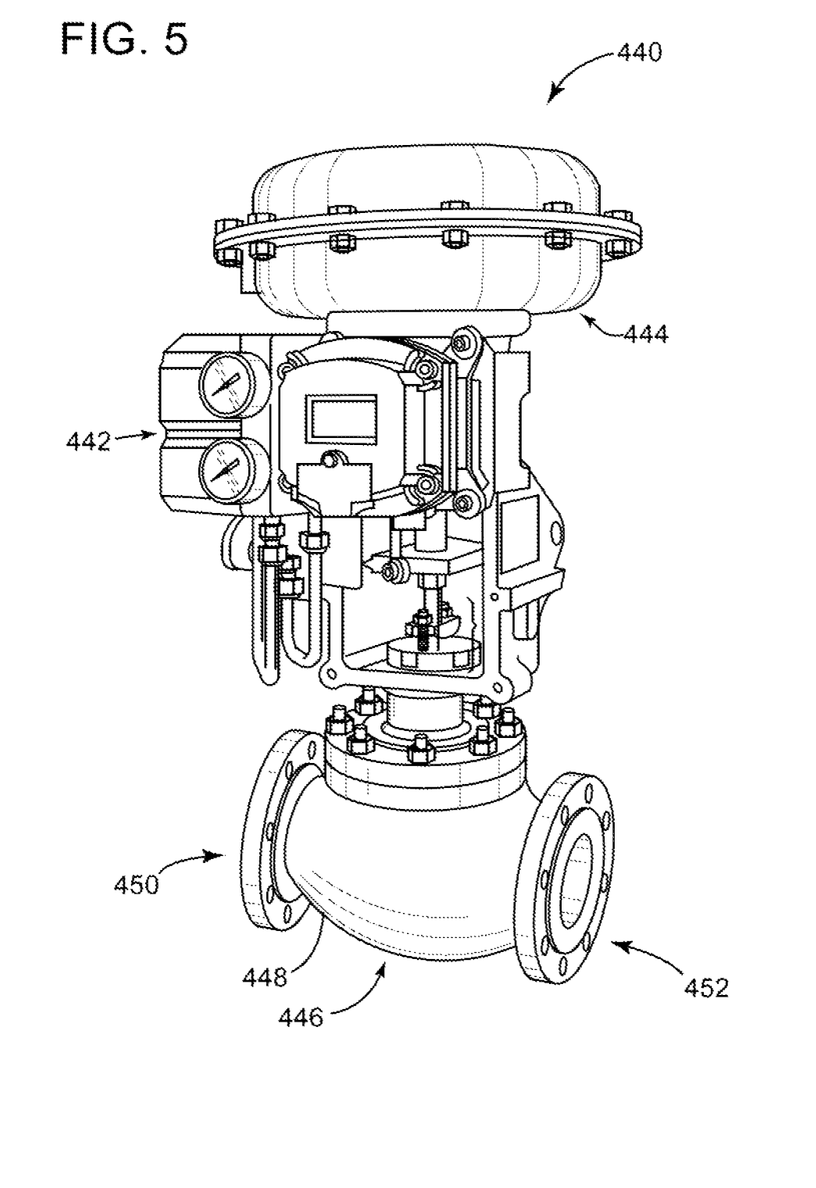
FIG. 5 depicts a perspective view of an example of a control valve assembly.
Figure 6:
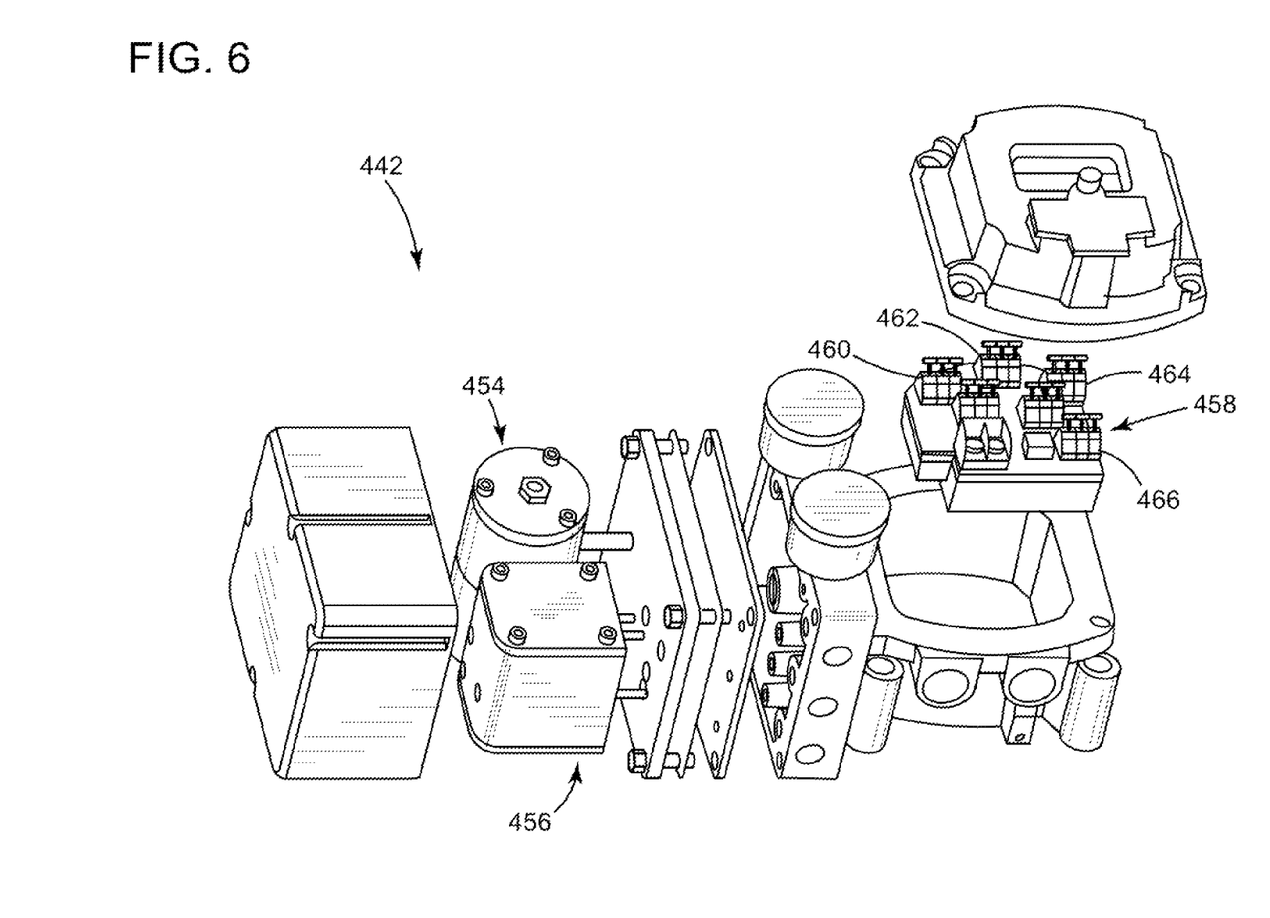
FIG. 6 depicts a perspective view of an example of a valve positioner in exploded form.

FIGS. 5 and 6 illustrate an exemplary embodiment of a system in the form of a control valve assembly 440. In FIG. 5, the control valve 440 includes a valve positioner 442, an actuator 444, and a fluid coupling 446 with a body 448 that has a first inlet/outlet 450 and a second inlet/outlet 452. This structure is typical of devices that can modulate a flow of working fluid between the inlet/outlets 450, 452.

FIG. 6 depicts an example of the valve positioner 442 in exploded form. As shown in this diagram, the valve positioner 442 has a plurality of valve components (e.g., a converter component 454, a relay component 456, a processing component 458). The valve components 454, 456, 458 work in combination to maintain the position of a valve disposed in the body 448 (FIG. 5) to modulate fluid flow across the inlet/outlets 450, 452 (FIG. 5). In one example, the processing component 458 can include operative hardware with one or more processing units (e.g., a first processing unit 460, a second processing unit 462, a third processing unit 464, and a fourth processing unit 466).

Examples of the processing component 458 manage operation of the valve components 454, 456 to regulate flow of working fluid across the valve assembly 440 (FIG. 5). These examples can comprise one or more discrete components (e.g., resistors, transistors, capacitors, etc.) including processing units 460, 462, 464, 466 that reside on one or more substrates (e.g., a printed circuit board). These components may include one or more processors (e.g., an ASIC, FPGA, etc.) that can execute executable instructions in the form of software, computer programs, and firmware. These executable instructions can be stored on memory. In one embodiment, the processing component 458 can include one or more programmable switches, inputs that couple with sensors for position feedback, a proportional-integral-derivative (PID) controller, a display (e.g., an LCD display), and like components that facilitate use and operation of the control valve assembly 440 (FIG. 5).

In view of the foregoing, this disclosure contemplates configurations of a valve assembly (and/or system and/or valve positioner) that are configured to perform steps and operations to process data. These steps can determine a quality measure for a first sample set of data relative to a second sample set of data and generate an output. The steps an also incorporate one or more of the processing steps recited herein. Examples of the output can convey information that reflects this quality measure. As noted herein, the output may comprise data (e.g., data from the first sample set), the quality measure, the first value, the second value, and other data, as desired). In one example, the output is configured read data into a repository, e.g., having a first buffer and a second buffer.

In one embodiment, a valve assembly (and/or system and/or valve positioner) comprises a sampling device comprising a processor having access to a memory with executable instructions stored thereon and configured to be executed by the processor, wherein the executable instructions comprise instructions for determining a quality measure for a first sample set of data, the quality measure indicating the usefulness of the first sample set of data relative to a second sample set of data; and generating an output that reflects the quality measure, wherein in one example the output comprises data from the first sample set in response to the quality measure indicating a first value for a diagnostic statistic for the first sample set of data is different from a second value for the diagnostic statistic for the second sample set of data. This response can reflect that the first sample set of data is relatively more useful than the second sample set of data.

Accordingly, a technical effect of embodiments of the methods, and systems and devices implementing these methods, is to identify data that is most useful for valve diagnostics and related processing of valve assemblies on a process line. The methods determine a quality measure that distinguishes a first sample set of data from a second sample set of data. This quality measure can help determine whether data in the first sample set is better suited for use in diagnostic programs that can analyze performance of valve assembles.

One or more of the steps of the methods (e.g., methods 200) can be coded as one or more executable instructions (e.g., hardware, firmware, software, software programs, etc.). These executable instructions can be part of a computer-implemented method and/or program, which can be executed by a processor and/or processing device. The processor may be part a component that is adapted to execute these executable instructions, as well as to process inputs and to generate outputs, as set forth herein. For example, the software can run on the valve assembly, valve positioner, and process system and/or as software, application, or other aggregation of executable instructions on a separate computer, tablet, lap top, smart phone, and like computing device.

Examples of a processor can integrate into the process line and/or reside remote from the process line as a stand-alone computing device, network, and like computing arrangement. The memory and the processor can include hardware that incorporates with other hardware (e.g., circuitry) to form a unitary and/or monolithic unit devised to execute computer programs and/or executable instructions (e.g., in the form of firmware and software). In other examples, these devices integrate, in whole or in part, with components of the valve assemblies, sampling devices, and other components contemplated herein.

Exemplary circuits of this type include discrete elements such as resistors, transistors, diodes, switches, and capacitors. Examples of a processor include microprocessors and other logic devices such as field programmable gate arrays ("FPGAs") and application specific integrated circuits ("ASICs"). Memory includes volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

Moreover, as will be appreciated by one skilled in the art, aspects of the present disclosure may be embodied as a system, method or computer program product. The embodiments can take the form of an entirely hardware embodiment, an entirely software embodiment (including firmware, resident software, micro-code, etc.) or an embodiment combining software and hardware aspects that may all generally be referred to herein as a "circuit," "module" or "system." For computer program products, the executable instructions may reside on one or more computer readable medium(s), for example, a non-transitory computer readable medium having computer readable program code embodied thereon.

Computer program code for carrying out operations for aspects of the present invention may be written in any combination of one or more programming languages, including an object oriented programming language and conventional procedural programming languages. Program code embodied on a computer readable medium may be transmitted using any appropriate medium, including but not limited to wireless, wireline, optical fiber cable, RF, etc., or any suitable combination of the foregoing.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A valve assembly, comprising:
   a valve having a plug configured to move among a plurality of positions relative to a seat;
   a valve positioner coupled with the valve, the valve positioner comprising a processor and a memory with executable instructions stored thereon and configured to be executed by the processor,
   wherein the valve positioner is configured to access a repository coupled with the valve positioner, the repository comprising a first buffer and a second buffer, each for storing data, and
   wherein the executable instructions comprise instructions for steps that, when executed by the processor, cause the valve positioner to:
      continuously acquire datasets that quantify values for setpoint, position, and actuator pressure for the valve;
      read the datasets into the first buffer;
      determine a quality measure for a first sample set of the data from the first buffer by,
         calculating a first value for a diagnostic statistic using the first sample set;
         comparing the first value to a second value of the diagnostic statistic calculated from a second sample set of the data acquired chronologically before the first sample set, the first value and the second value of the diagnostic statistic quantifying performance of the valve as variance in one or more of the setpoint, position, and actuator pressure across all datasets;
         using a relative position of the first value relative to the second value to assign the quality measure;
      read the first sample set of data from the first buffer into the second buffer in response to the quality measure indicating that the first value is different from the second value which indicates that the first sample set of data shows observable movement of the plug on the valve;
      calculate a performance indicator from the data in the second buffer, the performance indicator relating the observable movement to onset of problematic operation of the valve, and
      generate an output with instructions to operate the valve in response to a signal from a host device, the instructions reflecting the performance indicator to cause the valve to operate to maintain stability of a process that uses the valve.

2. The valve assembly of claim 1, wherein the diagnostic statistic comprises a weighted average of the performance metrics for the valve.

3. The valve assembly of claim 1, wherein the executable instructions comprise instructions for receiving a signal and generating an output in response to the signal, wherein the output communicates data for use by a device remote from the valve that performs the diagnostic programs with the data.

4. The valve assembly of claim 3, wherein the data comprises one or more of the first value and the second value.

5. The valve assembly of claim 3, wherein the data comprises data from one or more of the first buffer and the second buffer.

6. The valve assembly of claim 1, wherein the valve positioner incorporates the first buffer and the second buffer.

* * * * *